United States Patent [19]
Budecker et al.
[11] 4,130,127
[45] Dec. 19, 1978

[54] ACCUMULATOR CHANGING VALVE

[75] Inventors: Ludwig Budecker, Frankfurt am Main; Anton David, Goetzenhain, both of Germany

[73] Assignee: ITT Industries, Inc., New York, N.Y.

[21] Appl. No.: 803,176

[22] Filed: Jun. 3, 1977

[30] Foreign Application Priority Data

Jun. 5, 1976 [DE] Fed. Rep. of Germany ....... 2625555

[51] Int. Cl.² .............................................. G05D 15/00

[52] U.S. Cl. .................................... 137/101; 137/115; 137/118

[58] Field of Search ....................... 137/101, 115, 118; 91/412; 60/418

[56] References Cited

U.S. PATENT DOCUMENTS

| | | | |
|---|---|---|---|
| 3,570,519 | 3/1971 | Bianchetta | 137/101 |
| 3,692,039 | 9/1972 | Ewald et al. | 137/118 |
| 3,834,162 | 9/1974 | Keady | 137/118 X |
| 3,886,848 | 6/1975 | Budecker et al. | 60/418 X |
| 3,915,186 | 10/1975 | Thomas | 137/101 |
| 3,937,243 | 2/1976 | Harkrader et al. | 137/118 X |
| 3,939,859 | 2/1976 | Veda et al. | 137/118 |
| 3,973,580 | 8/1976 | Veda | 137/101 |
| 4,016,895 | 4/1977 | Budecker | 137/101 |

*Primary Examiner*—William R. Cline
*Attorney, Agent, or Firm*—John T. O'Halloran; Alfred C. Hill

[57] ABSTRACT

A valve is disclosed for connecting a user port with a pressure port or a return port as required. A closure member which is acted upon by a pressure piston is shifted from a first into a second valve position. By disposing a throttle in the return port, a balanced pressure is achieved on all sides of the closure member during a valve position change process so that the valve changes from the first into the second position safely and rapidly.

12 Claims, 3 Drawing Figures

ACCUMULATOR CHANGING VALVE

BACKGROUND OF THE INVENTION

This invention relates to a valve for connecting a user port with a pressure port or a return port, including a slidable piston acted upon by a pressure in opposition to the force of a spring, and adapted to shift a closure member from a first into a second valve position, the closure member interrupting the connection between the return port and the user port in the first valve position, and the connection between the pressure port and the user port in the second valve position.

From the German published patent application DOS No. 2,364,413, an accumulator charging valve is known which includes a valve pressurizing or depressurizing the control chamber of a by-pass valve dependent upon the pressure prevailing in an accumulator.

This by-pass valve includes a piston which is slidable by the accumulator pressure acting thereon against the force of a plate spring. The piston has a tappet extending through a return port opening into a valve chamber. Opposite the return port, a pressure port likewise opens into the valve chamber. Furthermore, a user port opens into the valve chamber at right angles to the pressure and return ports. The orifices of pressure and return port at the valve chamber are designed as valve seats adapted to be closed by a ball forming a closure member, with the ball being disposed in the valve chamber with clearance.

In the first valve position, in which the accumulator pressure is below the change-point pressure of the valve, the tappet extends through the return port only to such an extent that it does not project into the valve chamber. By virtue of the pressure prevailing at the pressure port and acting on the ball, the ball is urged upon the valve seat of the return port, thereby closing the latter. The user port is then in communication with the pressure port via the valve chamber.

When the accumulator pressure reaches the change-point pressure of the valve, the force acting on the piston overcomes the force of the plate spring acting in opposition thereto. This causes displacement of the piston until its tappet comes to rest against the ball. For the piston to be displaced still further, it is necessary for the accumulator pressure to continue to increase in order to overcome, in addition to the spring force, also the force with which the ball is urged onto the valve seat of the return port. Only after this additional counterforce has been overcome will the piston be displaced further, with the tappet resting against the ball lifting the ball off the valve seat of the return port and shifting it into the second valve position in which the ball rests upon the valve seat of the pressure port, thereby closing the latter. This provides for communication of the user port with the return port.

By a change in the pressure at the pressure port during the valve position change process it may happen that the spring force and the force of the pressure fluid acting on the ball, which originates from the pressure port, are in equilibrium with the force of the accumulator pressure acting on the piston, so that the ball remains in a suspended state between the two valve positions.

SUMMARY OF THE INVENTION

It is an object of the present invention to provide a valve as defined in the first paragraph of the heading "Background of the Invention" which changes from the first into the second valve position safely and rapidly upon the attainment of a predetermined change-point pressure.

A feature of the present invention is the provision in a valve for connecting a user port with a selected one of a pressure port and a return port including a slidable piston acted upon by a pressure in opposition to the force of a spring, and adapted to shift a closure member from a first into a second valve position, the closure member interrupting the connection between the return port and the user port in the first valve position and providing a connection between the pressure port and the user port in the second valve position, improvements comprising: a throttle disposed in the return port.

Since the fluid volume supplied through the pressure port is larger than the fluid volume discharged through the user port and the throttled return port, immediately upon the lifting of the closure member off the valve seat of the return port, a pressure will develop in the return port between the valve seat and the throttle and cause the closure member to be relieved from pressure fully or in part. Therefore, since immediately upon the lifting of the closure member off its seat it is essentially only the spring force that has to be overcome by the force acting upon the piston, while the force acting additionally when the closure member is in its closing position is largely omitted, the valve changes instantly from the first into the second position, without there being a possibility for the closure member to remain in a suspended state.

The throttle disposed in the return port may be either a sharp-edged diaphragm or a throttling channel.

Advantageously, return port and pressure port open diametrically opposite into a valve chamber connected with the user port, with the closure member being slidably disposed in the valve chamber, and with the orifices of return and pressure ports being designed as valve seats. The closure member is advantageously a ball since it requires no particular guiding to accurately match the sealing surfaces of the closure member with the two valve seats.

In an advantageous embodiment of the invention, the piston has a tappet extending through the throttle and the return port and adapted to displace the closure member. It will be a particular advantage if the end of the tappet acting on the closure member has a smaller cross section. This provides for approximately equally sized applied surfaces on all sides of the closure member, thereby achieving a nearly complete pressure balance at the closure member when the valve changes its position.

In an advantageous embodiment of the throttle, the return port has over part of its length a diameter which is slightly larger than the diameter of the tappet. The resulting gap between the tappet and the wall of the return port is the throttle.

To hasten the progress of valve position change from the first into the second position, the characteristic curve of force of the spring is advantageously diminishing.

In an advantageous embodiment of the invention, the valve chamber connects with an accumulator via a check valve, the piston is exposed to accumulator pressure, and the user port is in communication with a control chamber into which a by-pass piston projects with one end, the piston controlling a by-pass between the pressure port and a second user component, with the other end thereof being exposed to the pressure from the pressure port.

BRIEF DESCRIPTION OF THE DRAWING

Above-mentioned and other features and objects of this invention will become more apparent by reference to the following description taken in conjunction with the accompanying drawing, in which.

DESCRIPTION OF THE PREFERRED EMBODIMENTS

Figure 1:
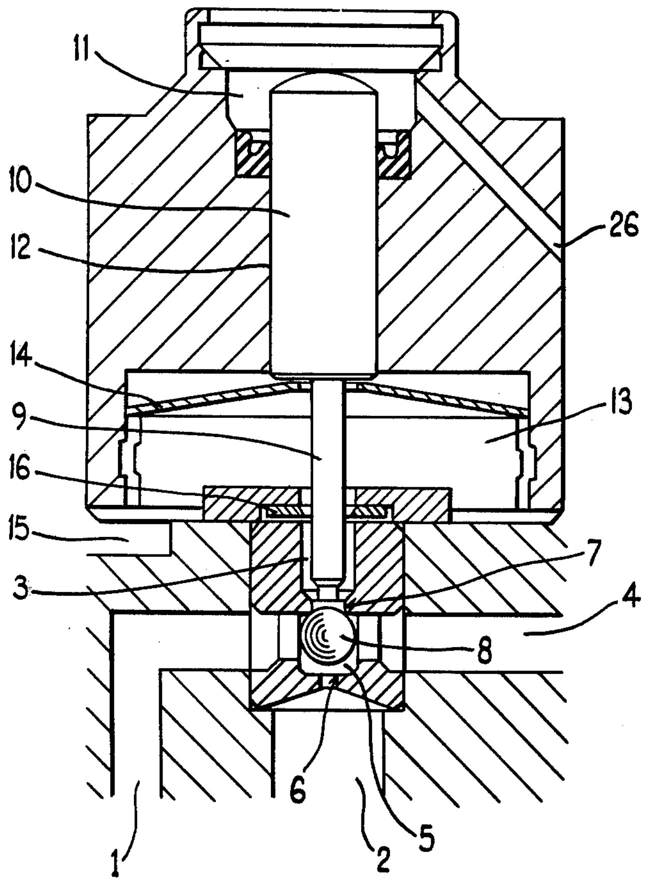
FIG. 1 is a sectional view of a first embodiment of a valve constructed in accordance with the principles of the present invention.
Figure 2:
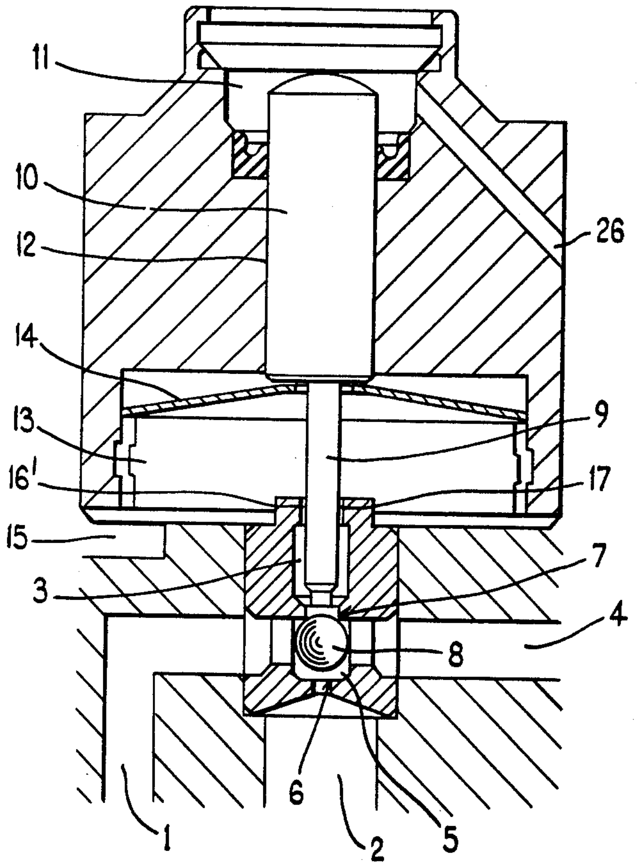
FIG. 2 is a sectional view of a second embodiment of a valve constructed in accordance with the principles of the present invention.

The valves illustrated in FIGS. 1 and 2 include a user port 1, a pressure port 2, a return port 3, and an accumulator port 4. These ports all terminate in a valve chamber 5, with pressure port 2 and return port 3 terminating diametrically opposite in valve chamber 5, and accumulator port 4 and user port 1 likewise terminating diametrically opposite in valve chamber 5, at right angles to the pressure and return ports 2 and 3, respectively. The orifices of pressure port 2 and return port 3 are designed as valve seats 6 and 7, respectively, and are adapted to be closed by a closure member 8 which is formed by a ball disposed in the valve chamber 5 with clearance.

A tappet 9 of a piston 10 extends through the return port 3. Piston 10, which is slidably guided in a cylindrical bore 12, projects with its end remote from the tappet 9 into a pressure chamber 11, while its end close to the tappet projects into a spring chamber 13, the piston being urged into pressure chamber 11 by a spring 14 supported in spring chamber 13. Return port 3 leads from valve chamber 5 to spring chamber 13 where a line 15 leads to a reservoir (not shown).

In FIG. 1, there is disposed at the orifice of the return port 3 opening into spring chamber 13 a throttle 16 formed as a sharp-edged diaphragm and restricting the cross section of passage of the return port 3 through which the tappet 9 extends.

In FIG. 2 there is likewise disposed a throttle 16' at the orifice of return port 3 opening into spring chamber 13, this throttle being formed by the return port 3 having over part 17 of its length a diameter only slightly larger than the diameter of tappet 9. The gap present in this partial area 17 between tappet 9 and the cylindrical wall of the return port 3 forms the throttle.

The mode of operation of the valves illustrated in FIGS. 1 and 2 is as follows:

If the pressure in pressure chamber 11 is below a predetermined change-point pressure, the valves will be in their illustrated positions which is the first valve position. In this case, piston 10 is displaced into pressure chamber 11, with tappet 9 extending through return port 3 but not as far as to the ball serving as closure member 8. The pressure prevailing at pressure port 2 acts upon closure member 8, urging it upon valve seat 7 of return port 3, thereby closing the latter. Via valve chamber 5, user port 1 and accumulator port 4 are in communication with pressure port 2 so that they are exposed to pressure from pressure port 2. When the pressure in pressure chamber 11 reaches the predetermined change-point pressure of the valve, the force acting on piston 10 will overcome the force of spring 14 acting in opposition thereto and displace piston 10, thereby causing tappet 9 of piston 10 to rest against closure member 8 instantly. The pressure acting on piston 10 then overcomes, in addition to the force of spring 14, the force with which closure member 8 is urged onto valve seat 7, lifting closure member 8 off valve seat 7.

Since throttle 16 or 16' is disposed in return port 3, a pressure will develop across closure member 8 on the side of return port 3, this pressure acting in opposition to the pressure applied from pressure port 2 to closure member 8 and balancing it to a large degree.

The forces acting in opposition to the pressure applied to piston 10, i.e., the force of spring 14 and the force with which closure member 8 is urged upon valve seat 7, are thus reduced substantially down to the force of spring 14 immediately upon lifting of closure member 8 off valve seat 7, making it impossible for closure member 8 to remain in a suspended position in valve chamber 5, but permitting an instant change from the first valve position, in which closure member 8 rests against valve seat 7, to the second valve position in which closure member 8 rests against valve seat 6. In this process, user port 1 and accumulator port 4 are shut off from pressure port 2 and connected to return port 3 so that the pressure prevailing in these ports 1 and 4 will be reduced through return port 3 and throttle 16 or 16'.

Figure 3:
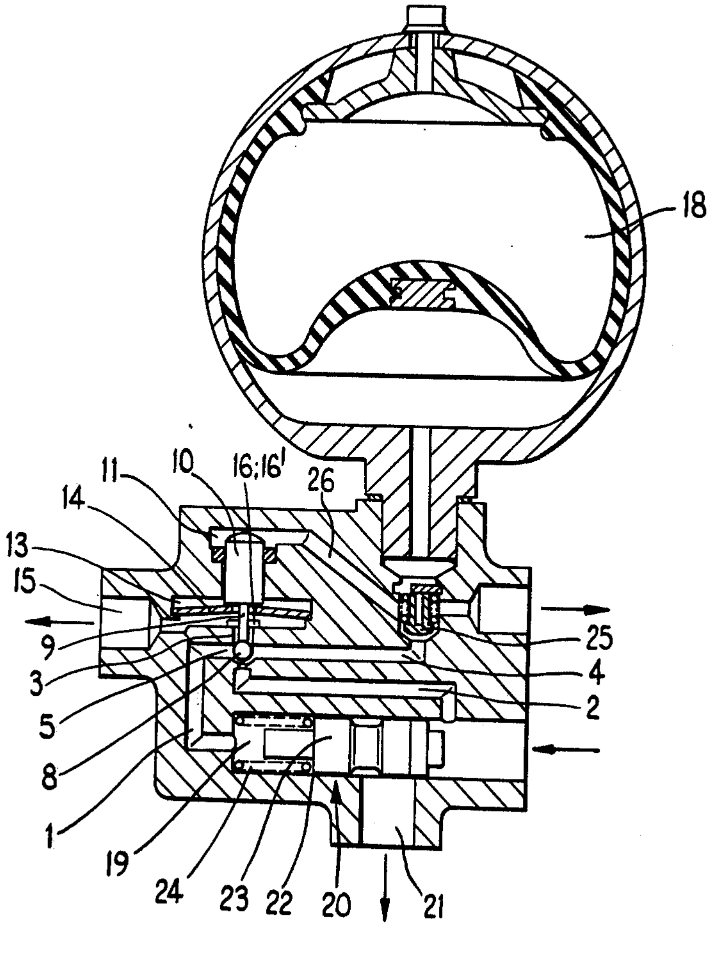
FIG. 3 is a sectional view of an accumulator charging valve incorporating a valve constructed in accordance with the principles of the present invention.

FIG. 3 shows an accumulator charging valve with an accumulator 18 to be supplied with pressure fluid. The accumulator charging valve comprises a valve corresponding to the embodiments according to the invention of FIGS. 1 or 2, a by-pass valve 20 and a check valve 25 controlling the accumulator charge. Check valve 25 is disposed in accumulator port 4 leading from valve chamber 5 to accumulator 18.

The by-pass valve 20 comprises a by-pass piston 23 slidably arranged in a cylinder bore 22 and adapted to shut off a second user port 21 opening into cylinder bore 22. Control chamber 19 defined by by-pass piston 23 and the bottom of cylinder bore 22 is in communication with valve chamber 5 through user port 1. Further, control chamber 19 accommodates a compression spring 24 bearing upon by-pass piston 23 in the closing direction of by-pass valve 20. In the opening direction, by-pass piston 23 is exposed to the pressure from a pressure-fluid source (not shown) which supplies pressure fluid into cylinder bore 22. In its area in front of by-pass valve 20, cylinder bore 22 connects with valve chamber 5 via pressure port 2. In the valve position as illustrated, pressure fluid is supplied from the pressure-fluid source into accumulator 18 via cylinder bore 22, pressure port 2, valve chamber 5, accumulator port 4, and check valve 25. The force of compression spring 24 and the feed pressure prevailing in control chamber 19 which is also present on the side of by-pass piston 23 remote from control chamber 19 keep the by-pass piston 23 in the closing position.

When the pressure in accumulator 18, which is in communication with pressure chamber 11 of the valve via a connecting bore 26, reaches the predetermined change-point pressure of the valve, the valve will change its position as descirbed with reference to FIGS. 1 and 2, shut off the flow of pressure fluid from pressure port 2 to valve chamber 5, and provide for communication of the latter with return port 3. This relieves user port 1 and accumulator port 4 from pressure so that check valve 25 closes and control chamber 19 becomes depressurized. Since it is only the compression spring 24 which then acts on the by-pass piston 23 in the closing direction, the pressure from the pressure-fluid source will displace the by-pass piston into the opening direction, the passage of flow of the by-pass valve 20 being opened thereby.

If the pressure in accumulator 18 and in pressure chamber 11 drops again below the predetermined change-point pressure, the valve will change its position again so that the feed pressure from the pressure-fluid source will build up in control chamber 19 of by-pass valve 20, leading to balanced pressure at by-pass piston 23 and causing compression spring 24 to displace by-pass piston 23 into the closing position of by-pass valve 20.

The pressure then developing in valve chamber 5 and accumulator port 4 will open check valve 25, and the accumulator 18 will be charged again.

While we have described above the principles of our invention in connection with specific apparatus it is to be clearly understood that this description is made only by way of example and not as a limitation to the scope of our invention as set forth in the objects thereof and in the accompanying claims.

We claim:

1. A valve for connecting a user port with a pressure port or a return port comprising:

a valve chamber connected to said user port, said pressure port, said return port and an accumulator port, said return port and said pressure port opening diametrically opposite each other in said valve chamber and said user port and said accumulator port opening diametrically opposite each other in said valve chamber at right angles to said return port and said pressure port;

each of said return port and said pressure port having an orifice in said valve chamber acting as a valve seat;

a closure member disposed in said valve chamber;

a slidable piston associated with said return port acted upon by pressure in opposition to the force of a spring disposed adjacent said return port, said piston shifting said closure member from a first into a second valve position, said closure member interrupting the connection between said return port and said user port in said first valve position and interrupting the connection between said pressure port and said user port in said second valve position; and a throttle disposed in said return port spaced from said valve seat.

2. A valve according to claim 1, wherein said closure member is a ball.

3. A valve according to claim 2, wherein said piston includes a tappet extending through said throttle and said return port and adapted to displace said closure member.

4. A valve according to claim 3, wherein the end of said tappet acting on said closure member has a smaller cross section that the remainder of said tappet.

5. A valve according to claim 4, wherein said return port over a given length thereof spaced from said valve seat has a diameter which is slightly larger than the diameter of said tappet.

6. A valve according to claim 5, wherein said spring has a diminishing characteristic curve of force.

7. A valve according to claim 6, wherein said accumulator part connects with an accumulator via a check valve, said piston is exposed to pressure from said accumulator, said user port is in communication with a control chamber having one end of a by-pass piston disposed therein, said by-pass piston controlling a by-pass between said pressure port and a second user port with the other end of said by-pass piston being exposed to pressure from said pressure port.

8. A valve according to claim 1, wherein said piston includes a tappet extending through said throttle and said return port and adapted to displace said closure member.

9. A valve according to claim 8, wherein the end of said tappet acting on said closure member has a smaller cross section than the remainder of said tappet.

10. A valve according to claim 9, wherein said return port over a given length thereof spaced from said valve seat has a diameter which is slightly larger than the diameter of said tappet.

11. A valve according to claim 10, wherein said spring has a diminishing characteristic curve of force.

12. A valve according to claim 1, wherein said spring has a diminishing characteristic curve of force.

* * * * *